(12) United States Patent
Stewart

(10) Patent No.: US 7,459,131 B2
(45) Date of Patent: Dec. 2, 2008

(54) REDUCED TEMPERATURE REGERNERATING/CALCINING APPARATUS FOR HYDROGEN GENERATION

(75) Inventor: Albert E. Stewart, Sylmar, CA (US)

(73) Assignee: United Technologies Corporation, Hartford, CT (US)

(*) Notice: Subject to any disclaimer, the term of this patent is extended or adjusted under 35 U.S.C. 154(b) by 450 days.

(21) Appl. No.: 10/919,700

(22) Filed: Aug. 16, 2004

(65) Prior Publication Data

US 2006/0034753 A1 Feb. 16, 2006

(51) Int. Cl.
*B01J 8/04* (2006.01)
(52) U.S. Cl. .................. 422/191; 422/193; 422/211; 422/223; 422/224; 422/232; 48/61; 48/198.1; 48/127.7; 48/127.9
(58) Field of Classification Search .......... 48/61, 48/198.1, 127.7, 127.9; 422/191, 193, 211, 422/232, 223, 224
See application file for complete search history.

(56) References Cited

U.S. PATENT DOCUMENTS

| 4,226,839 | A  | * | 10/1980 | O'Neill et al. ............. 423/177 |
| 4,330,430 | A  | * | 5/1982  | Lancet et al. .............. 502/55  |
| 7,182,803 | B2 | * | 2/2007  | Stewart et al. ............. 95/269  |
| 2004/0068932 | A1 | * | 4/2004  | Stewart .................. 48/127.9 |
| 2005/0279023 | A1 | * | 12/2005 | Stewart et al. ............. 48/61   |
| 2005/0281722 | A1 | * | 12/2005 | Sprouse et al. ............ 423/220  |
| 2006/0045632 | A1 | * | 3/2006  | Sprouse et al. ............ 406/61   |

* cited by examiner

*Primary Examiner*—N. Bhat
(74) *Attorney, Agent, or Firm*—Carlson, Gaskey & Olds

(57) ABSTRACT

A method and apparatus are disclosed for regenerating calcium oxide used in the production of hydrogen gas. The method includes steps of: (a) streaming a solid reactant into an inlet port of a contactor vessel; (b) streaming a purge oxidant into an oxidant port of the contactor vessel to reduce a partial pressure of a gas over the solid reactant; (c) venting the gas from a gas port of the contactor vessel; and (d) removing the solid reactant from a discharge port of the contactor vessel.

9 Claims, 3 Drawing Sheets

REDUCED TEMPERATURE REGERNERATING/CALCINING APPARATUS FOR HYDROGEN GENERATION

FIELD OF THE INVENTION

The present invention relates to the production of hydrogen gas. More specifically, the invention relates to a method and apparatus for regenerating the adsorbent reactant calcium oxide from calcium carbonate, for example, to extract hydrogen from methane in a steam methane reformer.

BACKGROUND OF THE INVENTION

Hydrogen molecules and atoms are used in many commercial and industrial applications. Generally, hydrogen may be used for upgrading petroleum feed stock to more useful products. In addition, hydrogen is used in many chemical reactions for reducing or synthesizing compounds. For example, hydrogen is a primary chemical reactant in the production of cyclohexane, ammonia, and methanol. Moreover, hydrogen is recently becoming a fuel of choice because it reduces green house emissions. Specifically, hydrogen may be used in fuel cells and other similar applications to produce a substantially clean source of electricity for powering industrial machines and automobiles. Also, hydrogen may be incorporated into petroleum products to displace or remove sulfur, nitrogen, and unsaturated and aromatic chemicals, such as benzenes.

Several methods are known to remove or generate hydrogen from hydrocarbon compounds. Although many sources of hydrocarbon compounds may be used to generate hydrogen, methane or natural gas is most commonly used. These gases travel easily through various mechanisms and also serve as fuel in various reforming and generation processes. Hydrogen generation techniques generally include steam methane reformers and pressure swing absorbers. Other hydrogen production systems exploit the byproducts from various industrial processes and the electrical decomposition of water.

SUMMARY OF THE INVENTION

The present invention provides a method and apparatus that reduces the temperature required for inducing a chemical reaction, for example, for calcining a calcium compound in a reaction cooperator, advantageously prolonging the service life of the calcium compound and minimizing the amount of fuel required to maintain the temperature of the chemical reaction.

In one embodiment of the present invention, an apparatus includes:
 a contactor vessel;
 an inlet port coupled to the contactor vessel for streaming a solid reactant into the contactor vessel;
 an oxidant port coupled to the contactor vessel for streaming a purge oxidant into the contactor vessel to reduce a partial pressure of a gas released from the solid reactant;
 a gas port coupled to the contactor vessel for venting the gas from the contactor vessel; and
 a discharge port coupled to the contactor vessel for removing the solid reactant from the contactor vessel.

In another embodiment of the present invention, a method includes steps of: (a) streaming a solid reactant into an inlet port of a contactor vessel; (b) streaming a purge oxidant into an oxidant port of the contactor vessel to reduce a partial pressure of a gas released from the solid reactant; (c) venting the gas from a gas port of the contactor vessel; and (d) removing the solid reactant from a discharge port of the contactor vessel.

In a further embodiment of the present invention, an apparatus includes:
 means for containing a solid reactant during a separation reaction;
 means for streaming a solid reactant into the contactor vessel;
 means for streaming a purge oxidant into the contactor vessel to reduce a partial pressure of a gas released from the solid reactant;
 means for venting the gas from the contactor vessel; and
 means for removing the solid reactant from the contactor vessel.

In another embodiment of the present invention, a method includes reducing the temperature required to sustain a calcining reaction by burning hydrogen in the contactor vessel to avoid generating combustion products that contain carbon dioxide.

DESCRIPTION OF THE SEVERAL VIEWS OF THE DRAWINGS

The present invention is illustrated by way of example and not limitation in the accompanying figures, in which like references indicate similar elements throughout the several views of the drawings, and in which.

Figure 2:
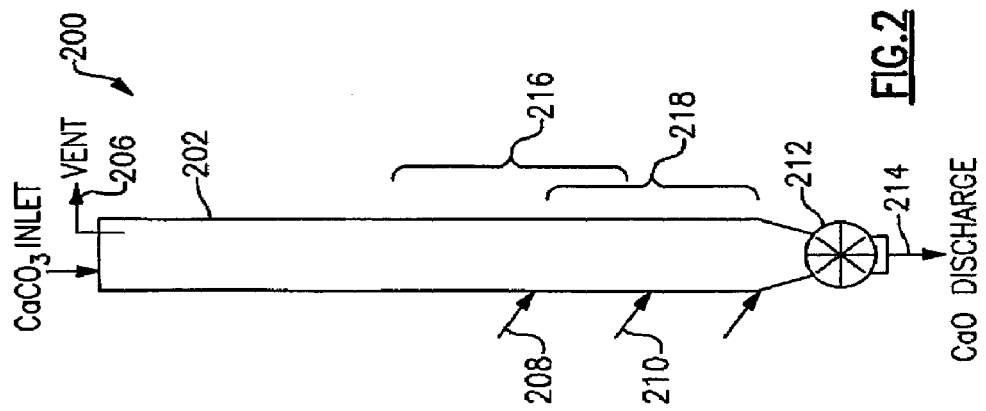
FIG. 2 illustrates a simplified schematic view of a counter-flow calciner according to an embodiment of the present invention.

Elements in the figures are illustrated for simplicity and clarity and have not necessarily been drawn to scale. For example, the dimensions of some elements in the figures may be exaggerated relative to other elements to point out distinctive features in the illustrated embodiments of the present invention.

DESCRIPTION OF THE ILLUSTRATED EMBODIMENTS

A pressure swing absorber (PSA) can generally produce a hydrogen product of about 99% pure hydrogen from a raw product gas that is subjected to a water separation to produce an inlet gas stream. The pressure swing absorber separates the inlet gas stream into two separate gas streams: a 99 percent pure hydrogen product stream and a byproduct gas stream containing the impurities that were removed from the inlet gas stream together with a substantial amount of hydrogen. The byproduct gas stream has a relatively low pressure compared to the hydrogen product stream, and may be used as fuel for the calciner. A typical composition for the various gas streams is:

(1) Raw Product Gas Stream
 0.68 dry gas fraction
 0.922 hydrogen mole fraction
 0.077 methane mole fraction
 trace carbon monoxide and carbon dioxide mole fractions
 ~319 psia pressure at 310 degrees Fahrenheit temperature (2) Inlet Gas Stream
 0.996 dry gas fraction
 0.922 hydrogen mole fraction
 0.077 methane mole fraction
 trace carbon monoxide and carbon dioxide mole fractions
 100 degrees Fahrenheit temperature
(3) Hydrogen Product Gas Stream
 99.99 percent hydrogen
 <10 ppm carbon monoxide
(4) Byproduct Gas Stream
 0.614 hydrogen (30 percent of the heating value)
 0.379 methane (70 percent of the heating value)

Generally, steam methane reformers (SMR) are used in large scale industrial processes to create the initial stream of hydrogen. Steam methane reformers generally produce less than 90% pure hydrogen molecules in their product streams. The reforming of methane generally proceeds according to the following reformation reaction:

$$\text{Reforming Reaction: } CH_4 + H_2O \rightarrow CO + 3H_2 \quad (1)$$

The reforming reaction produces a first portion of hydrogen product stream from the steam reformation of methane.

A second portion of hydrogen product is produced by the reaction of the carbon monoxide with steam:

$$\text{Shift Reaction: } CO + H_2O \text{ reaction} \rightarrow CO_2 + H_2 \quad (2)$$

The gaseous carbon dioxide is vented from the solid calcium oxide, and the regenerated calcium oxide is returned to the reaction cooperator. Typically, the calcination reaction is performed by heating the calcium carbonate to a temperature of about 1100 degrees Centigrade. Reactions (1) and (2) are the two main reactions that produce the hydrogen product in a steam methane reformer.

The byproduct carbon dioxide ($CO_2$) may be removed from the hydrogen stream by a reaction cooperator. A typical reaction cooperator includes calcium oxide, which removes carbon dioxide from the shift reaction. The removal of carbon dioxide, also known as a separation reaction, proceeds as follows:

$$\text{Separation Reaction: } CaO + CO_2 \rightarrow CaCO_3 \quad (3)$$

The net reaction that occurs in a steam methane reformer, that is, the sum of the reactions (1) and (2), is given by:

$$CH_4 + 2H_2O \rightarrow CO_2 + 4H_2 \quad (4)$$

Utilizing the carbon dioxide removal scheme with calcium oxide in addition to methane and steam results in the following reaction:

$$CH_4 + 2H_2O + CaO \rightarrow 4H_2 + CaCO_3 \quad (5)$$

Very little carbon dioxide and carbon monoxide are in the raw hydrogen product, which is mainly hydrogen, steam, and unreacted methane.

The product of the separation reaction is solid calcium carbonate, while the hydrogen product generated from the methane source is a gas. The hydrogen gas is readily vented from the reaction cooperator, and the solid calcium carbonate inside the reaction cooperator is replaced with regenerated calcium oxide.

The calcium oxide is typically regenerated from the calcium carbonate by heating the calcium carbonate to remove the carbon dioxide in a process called calcination. The calcination reaction proceeds as follows:

$$\text{Calcination Reaction: } CaCO_3 \rightarrow CaO + CO_2 \quad (6)$$

The gaseous carbon dioxide is vented from the solid calcium oxide, and the regenerated calcium oxide is returned to the reaction cooperator. Typically, the calcination reaction (6) is performed by heating the calcium carbonate to a temperature of about 1100 degrees Centigrade. The calcination reaction (6) is promoted by reducing the amount of carbon in the fuel gas and the corresponding amount of carbon monoxide formed in the calciner and by flowing the solid reactants through the calciner in a direction opposite from the flow of gases.

Using hydrogen as a fuel gas is beneficial in minimizing the carbon dioxide partial pressure and temperature required for calciner operation. Reducing the operating temperature of the calciner results in less sintering of the calcium oxide and a more reactive adsorbent in the calciner. Because the calcium compound is used continuously in a cyclical manner, sintering and corresponding reduction in reactivity is a cumulative process that requires periodically replacing the calcium compound. If the calcium compound may be recycled 500 times, then it may easily be considered to be cost effective.

Operation of the hydrogen generator that supplies the inlet gas to the calciner also results in very little carbon dioxide and carbon monoxide are generated in the hydrogen product. About 95 percent of the carbon in the hydrogen combustion products is methane, therefore the byproduct gas from the pressure swing absorber that is used as fuel in the calciner leaves minimal carbon dioxide per unit of heat content in the combustion product.

In a typical calciner operation of the prior art, the calcium carbonate formed from the separation reaction (3) is simply heated at atmospheric pressure to remove the carbon dioxide in the calcination reaction (6). Although this method is suitable for applications in which producing calcium oxide is an end in itself, there are advantages that may be realized by the method of the present invention when the calcium oxide is to be used in the generation of hydrogen. For example, in a hydrogen generator that produces hydrogen at a pressure of 25 to 30 atmospheres, it is desirable from an equipment configuration standpoint to perform the calcination at the same pressure so that the same vessel may be used for both hydrogen production and calcination.

Figure 1:
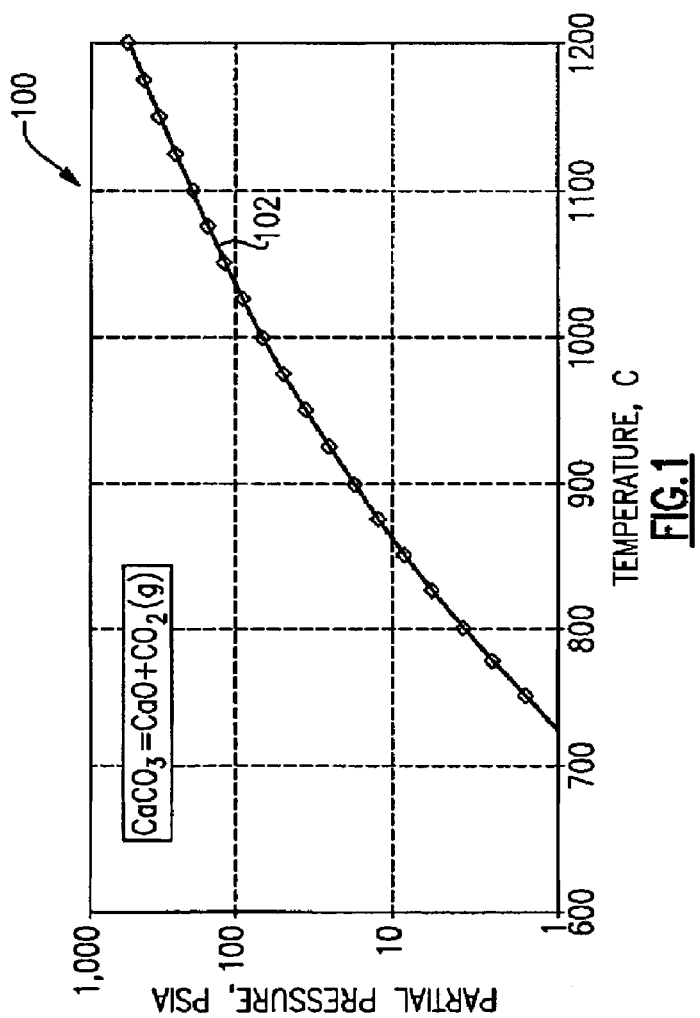
FIG. 1 illustrates a plot of carbon dioxide desorption partial pressure vs. temperature according to the prior art.

FIG. 1 illustrates a plot 100 of carbon dioxide desorption partial pressure vs. temperature according to the prior art. Shown in FIG. 1 is a desorption curve 102.

In the area above the desorption curve 102, carbon dioxide is absorbed by calcium oxide to form calcium carbonate. In the area below the desorption curve 102, carbon dioxide is desorbed, that is, released, from the calcium carbonate to form calcium oxide. As the partial pressure is increased, a higher temperature is required to maintain the calcination reaction (4) in the area below the desorption curve 102. Normally, a higher temperature would be required to release the carbon dioxide from the calcium carbonate under higher pressure as shown in FIG. 1. For example, at a partial pressure of about 200 psia, a temperature of about 1100 degrees Centigrade would be required to perform the calcination reaction (4).

A disadvantage of using a higher temperature to maintain the calcination reaction (4) is that sintering occurs when the calcium oxide is subjected repeatedly to temperatures above about 700 degrees Centigrade. Sintering disadvantageously reduces the effective surface area of the calcium oxide and decreases the carbon dioxide pore volume, reducing the capability of the calcium oxide to readily adsorb carbon dioxide. As a result, the performance of the regenerated calcium oxide is degraded in succeeding separation reaction cycles.

The disadvantages of the previous methods for regenerating calcium oxide for hydrogen production may be mitigated or avoided by the method and apparatus of the present invention for hydrogen production that incorporates calcination at a reduced temperature in the same contactor vessel as described below.

In one embodiment of the present invention, an apparatus includes:

a contactor vessel;

an inlet port coupled to the contactor vessel for streaming a solid reactant into the contactor vessel;

an oxidant port coupled to the contactor vessel for streaming a purge oxidant into the contactor vessel to reduce a partial pressure of a gas released from the solid reactant;

a gas port coupled to the contactor vessel for venting the gas from the contactor vessel; and a discharge port coupled to the contactor vessel for removing the solid reactant from the contactor vessel.

FIG. 2 illustrates a simplified schematic view of a counter-flow calciner 200 according to an embodiment of the present invention. Shown in FIG. 2 are a contactor vessel 202, an inlet port 204, a gas port 206, a fuel port 208, a oxidant port 210, a rotary valve 212, a discharge port 214, a heating zone 216, and a dilution zone 218.

The contactor vessel 202 may be, for example, a portion of a steam methane reformer. Alternatively, the contactor vessel 202 may be a standalone container suitable for containing the solid reactant under the temperature and pressure conditions used in the calcining process. The contactor vessel 202 contains the solid reactant during the calcination reaction (4) and is preferably oriented vertically to exploit the force of gravity for moving the solid reactant through the contactor vessel 202, however other orientations of the contactor vessel may be used to practice various embodiments of the present invention to suit specific applications. The inlet port 204 is an opening in the contactor vessel 202 that is used to receive a stream of solid reactant. In the example of FIG. 2, the solid reactant is calcium carbonate that is streamed or flowed into the contactor vessel 202 from a hydrogen reactor at a pressure of from about 25 to 40 atmospheres. However, other solid reactants besides calcium carbonate may be used to practice various embodiments of the present invention within the scope of the appended claims. The rotary valve 212 controls the rate of flow of the solid reactant through the contactor vessel 202. The rate of flow of the solid reactant through the rotary valve 212 is controlled according to well-known techniques, and the oxidized solid reactant is removed from the discharge port 214.

The fuel port 208 is an opening in the contactor vessel 202 that is used to receive fuel, for example, hydrogen supplied from the stream of unpurified hydrogen received by a steam methane reformer. The fuel is burned inside the contactor vessel 202 according to well-known techniques to heat the calcium carbonate to a temperature of about 950 degrees Centigrade in the heating zone 216. Hydrogen is preferably used as the fuel gas for the calciner, because its combustion products do not include carbon dioxide, thereby reducing the partial pressure of carbon dioxide and the required operating temperature as illustrated in the plot of FIG. 1.

The oxidant port 210 is an opening in the contactor vessel 202 that is used to receive a purge oxidant, for example, steam. The purge oxidant reduces the partial pressure of the carbon dioxide released from the heated calcium carbonate. The purge oxidant may also be another suitable gas or vapor besides steam that preferably does not include the gas being released from the solid reactant, in this example, carbon dioxide. The purge oxidant agitates the solid reactant in the dilution zone 218 and displaces the carbon dioxide gas released from the calcium carbonate toward the gas port 206. At the gas port 206, the carbon dioxide and the purge oxidant are vented and evacuated from the contactor vessel 202 according to well-known techniques.

In this example, the gas port 206 is located so that the released gas flows in a direction opposite that of the flow of the solid reactant in the contactor vessel 202, however, other locations of the gas port 206 may be selected to practice various embodiments of the present invention within the scope of the appended claims. The displacement of the carbon dioxide gas away from the calcium carbonate by the purge oxidant results in a reduction of the partial pressure of carbon dioxide gas released from the calcium carbonate. For example, the partial pressure of carbon dioxide gas released from the calcium carbonate may be reduced to a partial pressure of about 5 to 6 psia.

The reduction of the partial pressure of the carbon dioxide gas released from the solid reactant is an important feature of the present invention, because the reduced partial pressure allows the calcination reaction (4) to proceed at a substantially lower temperature relative to the pressure inside the contactor vessel 202. For example, a temperature of about 1150 degrees Centigrade used in a conventional calciner may be decreased to about 950 degrees Centigrade in a calciner of the present invention by the reduction of the partial pressure of the carbon dioxide gas released from the solid reactant. The lower required temperature advantageously results in lower fuel costs and significantly reduces sintering the calcium oxide, especially in view of the fact that the degree of sintering has been found to increase exponentially with temperature. As a result, the regenerated calcium oxide may be used in a greater number of hydrogen production cycles, thereby reducing the cost of replacing the calcium oxide.

In another aspect of the present invention, a method includes steps of: (a) streaming a solid reactant into an inlet port of a contactor vessel; (b) streaming a purge oxidant into an oxidant port of the contactor vessel to oxidize the solid reactant by reducing a partial pressure of a gas around the solid reactant; (c) venting the gas from a gas port of the contactor vessel; and (d) removing the solid reactant from a discharge port of the contactor vessel.

Figure 3:
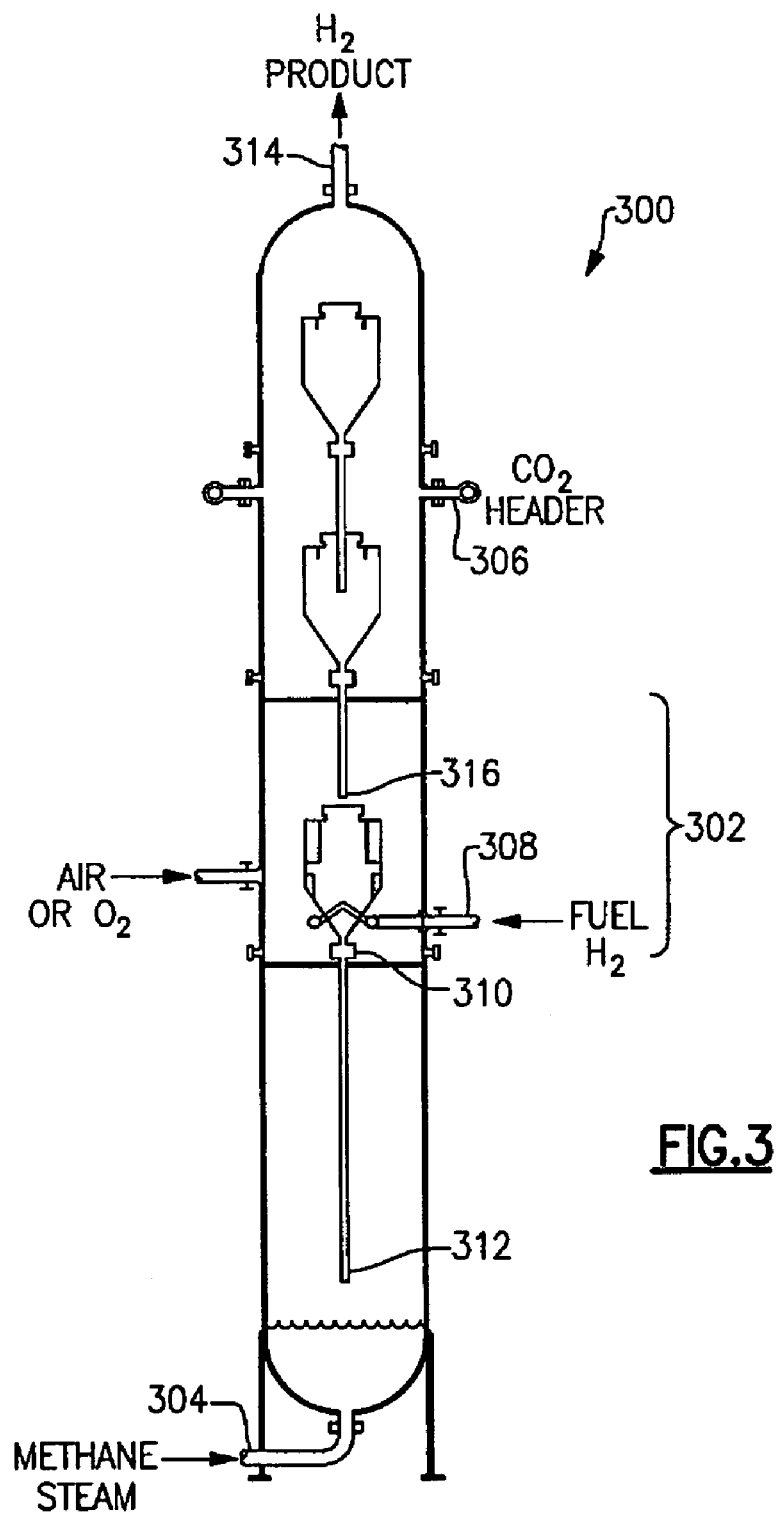
FIG. 3 illustrates a diagram of a hydrogen generator according to an embodiment of the present invention.

FIG. 3 illustrates a diagram of a hydrogen generator 300 according to an embodiment of the present invention. Shown in FIG. 3 are a calciner section 302, a methane/steam inlet 304, a primary bed 304, a gas port 306, a fuel port 308, a rotary valve 310, a discharge port 312, a hydrogen outlet port 314, and an inlet port 316.

In FIG. 3, the solid reactant calcium carbonate is received from the inlet port 316 and heated by burning fuel from the fuel port 308 to oxidize the calcium carbonate and regenerate the calcium oxide. The regenerated calcium oxide is delivered at a rate controlled by the rotary valve 310 to the discharge port 312. As a result, both the hydrogen generator and the calciner are advantageously incorporated into a single contactor vessel.

Incorporating the calciner 200 of the present invention described with reference to FIG. 2 into the calciner section 302 substantially enhances the performance of the hydrogen generator 300 in FIG. 3. The same devices used to implement the several ports and the rotary valve in the hydrogen generator 300 may be used to implement the corresponding elements used in the calciner 200 of FIG. 2. Other suitable devices may also be used to make the ports and the rotary valve used in the calciner 200 according to well-known techniques to practice various embodiments of the present invention within the scope of the appended claims.

Figure 4:
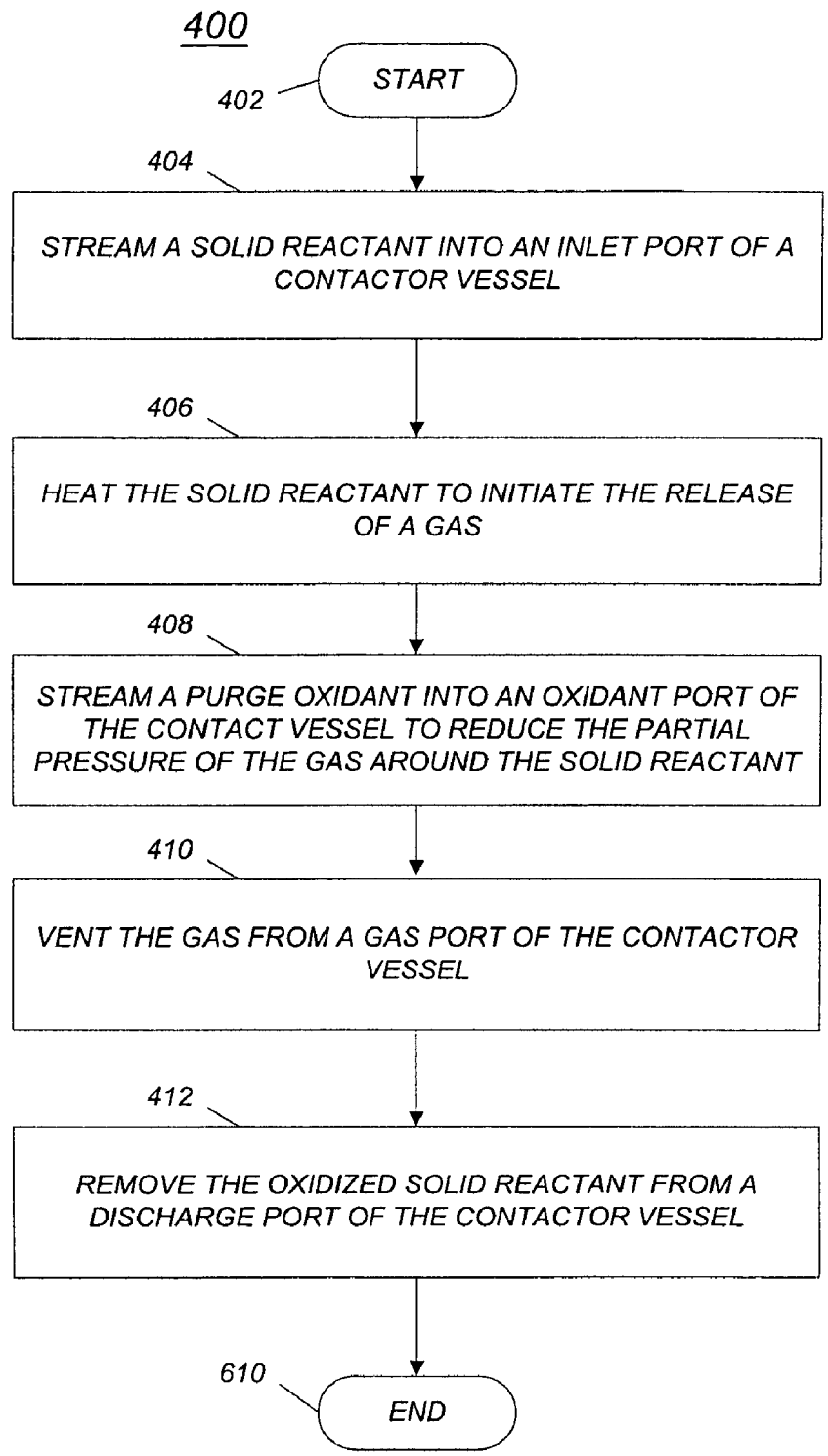
FIG. 4 illustrates a flow chart of a method of calcining at a reduced temperature according to an embodiment of the present invention.

FIG. 4 illustrates a flow chart 400 of a method of calcining at a reduced temperature according to an embodiment of the present invention.

Step 402 is the entry point of the flow chart 400.

In step 404, a solid reactant is streamed into an inlet port of a contactor vessel. The solid reactant may be, for example, calcium carbonate produced by a hydrogen reactor.

In step 406, the solid reactant is heated to initiate the release of a gas, for example, carbon dioxide, from the solid reactant. In some applications, heating of the solid reactant may not be a necessary step.

In step 408, a purge oxidant, for example, steam, is streamed into an oxidant port of the contactor vessel to reduce the partial pressure of the gas released from the solid reactant to produce oxidized solid reactant. The purge oxidant also agitates the solid reactant, which enhances the displacement of the released gas away from the oxidized solid reactant.

In step 410, the gas is vented from a gas port of the contactor vessel.

In step 412, the oxidized solid reactant is removed from a discharge port of the contactor vessel. The oxidized solid reactant may then be returned, for example, to a hydrogen reactor to repeat the separation reaction (3).

Step 414 is the exit point of the flow chart 400.

Although the method of the present invention illustrated by the flowchart description above is described and shown with reference to specific steps performed in a specific order, these steps may be combined, sub-divided, or reordered without departing from the scope of the claims. Unless specifically indicated herein, the order and grouping of steps is not a limitation of the present invention.

While the invention herein disclosed has been described by means of specific embodiments and applications thereof, numerous modifications and variations could be made thereto by those skilled in the art without departing from the scope of the invention set forth in the following claims.

What is claimed is:

1. A calcining apparatus comprising:
   a contactor vessel;
   a solid reactant inlet port coupled to the contactor vessel for streaming a solid reactant into the contactor vessel;
   an oxidant inlet port coupled to the contactor vessel for streaming a purge oxidant into the contactor vessel to reduce a partial pressure of a gas released from the solid reactant;
   a fuel inlet port coupled to the contactor vessel for introducing fuel to heat the solid reactant;
   a gas vent port coupled to the contactor vessel for venting the gas from the contactor vessel; and
   a solid reactant discharge port coupled to the contactor vessel for removing the solid reactant from the contactor vessel.

2. The calcining apparatus of claim 1 further comprising a feed stream of hydrogen gas coupled with the fuel inlet port.

3. The calcining apparatus of claim 1 further comprising a feed stream of calcium carbonate coupled with the solid reactant inlet port.

4. The calcining apparatus of claim 1 further comprising a feed stream of steam coupled with the oxidant inlet port.

5. The calcining apparatus of claim 1 further comprising a hydrogen gas outlet port for removing hydrogen gas from the contactor vessel.

6. The calcining apparatus of claim 1 wherein fuel inlet port is located between the oxidant inlet port and the gas vent port.

7. The calcining apparatus of claim 1 wherein the oxidant inlet port is located between the fuel inlet port and solid reactant discharge port.

8. The calcining apparatus of claim 1 further comprising a rotary valve adjacent to and fluidly connected with the solid reactant discharge port.

9. A calcining apparatus comprising:
   a regeneration vessel including a solid reactant feed for delivering spent solid reactant to the regeneration vessel, an oxidant gas feed for delivering oxidant gas to the vessel to reduce the partial pressure of a gas released from the solid reactant feed, a fuel gas inlet for delivering fuel gas to the vessel, a gas vent outlet for venting a product gas from regeneration of the spent solid reactant, and a solid reactant discharge outlet for removing regenerated solid reactant from the regeneration vessel.

* * * * *

UNITED STATES PATENT AND TRADEMARK OFFICE
CERTIFICATE OF CORRECTION

PATENT NO. : 7,459,131 B2 Page 1 of 1
APPLICATION NO. : 10/919700
DATED : August 16, 2004
INVENTOR(S) : Albert E. Stewart It is certified that error appears in the above-identified patent and that said Letters Patent is hereby corrected as shown below:

Title Page,:

Item (73) Assignee should read: --PRATT & WHITNEY ROCKETDYNE, INC., Canoga Park, CA (US)--

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,459,131 B2                                                  Page 1 of 1
APPLICATION NO.   : 10/919700
DATED             : December 2, 2008
INVENTOR(S)       : Albert E. Stewart It is certified that error appears in the above-identified patent and that said Letters Patent is hereby corrected as shown below:

Title Page,:

Item (73) Assignee should read: --PRATT & WHITNEY ROCKETDYNE, INC., Canoga Park, CA (US)--

This certificate supersedes the Certificate of Correction issued April 7, 2009.

Signed and Sealed this

Twenty-eighth Day of April, 2009

JOHN DOLL
*Acting Director of the United States Patent and Trademark Office*